US011449327B2

(12) United States Patent
David et al.

(10) Patent No.: US 11,449,327 B2
(45) Date of Patent: Sep. 20, 2022

(54) ERROR-RESILIENT OVER-THE-AIR SOFTWARE UPDATES FOR VEHICLES

(71) Applicant: PACCAR Inc, Bellevue, WA (US)

(72) Inventors: Adrian David, Kent, WA (US); Alan Yip, Kent, WA (US); Andrew Paul Harbach, Argyle, TX (US); Hilario Koyama, Bothell, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 16/206,766

(22) Filed: Nov. 30, 2018

(65) Prior Publication Data

US 2020/0174779 A1 Jun. 4, 2020

(51) Int. Cl.
| | |
|---|---|
| *G06F 8/654* | (2018.01) |
| *G06F 11/14* | (2006.01) |
| *H04L 67/12* | (2022.01) |
| *G07C 5/00* | (2006.01) |
| *H04L 67/00* | (2022.01) |

(52) U.S. Cl.
CPC .......... *G06F 8/654* (2018.02); *G06F 11/1433* (2013.01); *G06F 11/1469* (2013.01); *G07C 5/008* (2013.01); *H04L 67/12* (2013.01); *H04L 67/34* (2013.01)

(58) Field of Classification Search
CPC ........ G06F 8/65; G06F 8/654; G06F 11/1433; G06F 11/1469; G07C 5/008; H04L 67/12; H04L 67/34
USPC .......................................................... 717/173
See application file for complete search history.

(56) References Cited

U.S. PATENT DOCUMENTS

| | | | |
|---|---|---|---|
| 5,278,759 | A | 1/1994 | Berra et al. |
| 5,394,327 | A | 2/1995 | Simon, Jr. et al. |
| 5,442,553 | A | 8/1995 | Parillo |
| 5,490,064 | A | 2/1996 | Minowa et al. |

(Continued)

FOREIGN PATENT DOCUMENTS

| | | |
|---|---|---|
| CN | 101080697 B | 4/2010 |
| CN | 202887167 U | 4/2013 |

(Continued)

OTHER PUBLICATIONS

PCT International Search Report and Written Opinion in International Application PCT/US2019/063881, dated Mar. 5, 2020, 8 pages.

*Primary Examiner* — Jason D Mitchell
(74) *Attorney, Agent, or Firm* — Merchant & Goud P.C.

(57) ABSTRACT

An on-board vehicle computer system receives a software update package from a remote computer system via a wireless communication network. The update package includes a software update for an updatable electronic component (e.g., an ECU) of the vehicle. Prior to installing the update, the vehicle computer system may check for a valid backup software version in a storage medium in the vehicle computer system to facilitate reversion to a previous software version in the event of an error during installation of the update. Installation of the update may be delayed until a compatible backup software version is obtained. After installation of the update, the system stores the update in the storage medium as the current backup software version for the updatable electronic component. This facilitates rollback to a functional state in the event of an error during a future update.

20 Claims, 5 Drawing Sheets

(56) References Cited

U.S. PATENT DOCUMENTS

| | | |
|---|---|---|
| 5,896,566 A | 4/1999 | Averbuch et al. |
| 5,922,037 A | 7/1999 | Potts |
| 6,181,994 B1 | 1/2001 | Colson et al. |
| 6,243,627 B1 | 6/2001 | Ozeki |
| 6,253,122 B1 | 6/2001 | Razavi et al. |
| 6,370,455 B1 | 4/2002 | Larson et al. |
| 6,434,455 B1 | 8/2002 | Snow et al. |
| 6,457,076 B1 | 9/2002 | Cheng et al. |
| 6,487,717 B1 | 11/2002 | Brunemann et al. |
| 6,628,233 B2 | 9/2003 | Knockeart et al. |
| 6,677,854 B2 | 1/2004 | Dix |
| 6,678,591 B2 | 1/2004 | Ohmura et al. |
| 6,820,259 B1 | 11/2004 | Kawamata et al. |
| 6,839,614 B1 | 1/2005 | Timko et al. |
| 6,954,687 B2 | 10/2005 | Taguchi et al. |
| 6,965,326 B2 | 11/2005 | Allison |
| 6,975,612 B1 | 12/2005 | Razavi et al. |
| 6,978,198 B2 | 12/2005 | Shi |
| 7,024,581 B1* | 4/2006 | Wang .................. G06F 11/1417 713/2 |
| 7,142,962 B1 | 11/2006 | Pflieger et al. |
| 7,233,814 B2 | 6/2007 | Wissinger et al. |
| 7,272,475 B2 | 9/2007 | Gawlik et al. |
| 7,280,900 B2 | 10/2007 | Gault et al. |
| 7,349,769 B2 | 3/2008 | Hayashi et al. |
| 7,366,589 B2 | 4/2008 | Habermas |
| 7,506,309 B2 | 3/2009 | Schaefer |
| 7,558,603 B2 | 7/2009 | Kadel et al. |
| 7,623,853 B2 | 11/2009 | Vikse et al. |
| 7,792,799 B2* | 9/2010 | Craswell ............. G06F 11/1451 707/640 |
| 8,190,322 B2 | 5/2012 | Lin et al. |
| 8,224,789 B1* | 7/2012 | Caklovic ............. G06F 11/1469 707/674 |
| 8,311,507 B2 | 11/2012 | Wheatley et al. |
| 8,336,042 B2 | 12/2012 | Touati et al. |
| 8,386,589 B2 | 2/2013 | Keefe et al. |
| 8,498,771 B2 | 7/2013 | Dwan et al. |
| 8,559,910 B2 | 10/2013 | Yi et al. |
| 8,655,541 B2 | 2/2014 | You |
| 8,688,313 B2 | 4/2014 | Margol et al. |
| 8,713,299 B2 | 4/2014 | Quinn et al. |
| 8,768,537 B2 | 7/2014 | Kim et al. |
| 8,875,123 B2 | 10/2014 | Shiba |
| 8,880,289 B2 | 11/2014 | Uehara |
| 8,930,067 B1 | 1/2015 | Green et al. |
| 8,965,627 B2 | 2/2015 | Murakami |
| 8,972,712 B2 | 3/2015 | Braunberger |
| 8,996,232 B2 | 3/2015 | Dwan et al. |
| 9,086,941 B1 | 7/2015 | Siegel |
| 9,128,798 B2 | 9/2015 | Hoffman et al. |
| 9,240,081 B2 | 1/2016 | Ko |
| 9,253,200 B2 | 2/2016 | Schwarz et al. |
| 9,274,786 B2 | 3/2016 | Ji |
| 9,361,090 B2 | 6/2016 | Elzein |
| 9,374,355 B2 | 6/2016 | Schwarz et al. |
| 9,443,358 B2 | 9/2016 | Breed |
| 9,464,905 B2 | 10/2016 | Lewis |
| 9,524,160 B2 | 12/2016 | Takahashi et al. |
| 9,529,580 B2 | 12/2016 | Vangelov et al. |
| 9,529,584 B2 | 12/2016 | Eling |
| 9,557,981 B2 | 1/2017 | Throop et al. |
| 9,575,743 B1 | 2/2017 | Chun |
| 9,626,175 B2 | 4/2017 | Davey et al. |
| 9,672,025 B2 | 6/2017 | Martin et al. |
| 9,705,990 B2 | 7/2017 | Kresse et al. |
| 9,720,680 B2 | 8/2017 | Diedrich et al. |
| 9,722,781 B2 | 8/2017 | Smereka et al. |
| 2001/0002814 A1 | 6/2001 | Suganuma et al. |
| 2002/0019877 A1 | 2/2002 | Wrede |
| 2002/0065698 A1 | 5/2002 | Schick et al. |
| 2002/0110146 A1 | 8/2002 | Thayer et al. |
| 2003/0093199 A1 | 5/2003 | Mavreas |
| 2003/0126511 A1* | 7/2003 | Yang .................... G06F 9/4401 714/39 |
| 2003/0188303 A1 | 10/2003 | Barman et al. |
| 2003/0195951 A1 | 10/2003 | Wittel, Jr. et al. |
| 2003/0232619 A1 | 12/2003 | Fraser |
| 2004/0068334 A1* | 4/2004 | Tsai ....................... G06F 8/65 700/86 |
| 2004/0092255 A1* | 5/2004 | Ji ...................... G06F 11/1433 455/419 |
| 2004/0111188 A1 | 6/2004 | McClure et al. |
| 2004/0117414 A1* | 6/2004 | Braun ..................... G06F 8/65 |
| 2004/0192189 A1 | 9/2004 | Yuhara et al. |
| 2004/0214599 A1 | 10/2004 | Ogino |
| 2004/0215755 A1* | 10/2004 | O'Neill .................. G06F 8/654 709/223 |
| 2005/0085222 A1* | 4/2005 | Przybilski ............... G06F 8/65 455/418 |
| 2005/0090941 A1 | 4/2005 | Stefan et al. |
| 2006/0130033 A1 | 1/2006 | Stoffels et al. |
| 2006/0225067 A1* | 10/2006 | Yang ....................... G06F 8/65 717/168 |
| 2006/0230081 A1* | 10/2006 | Craswell ............ G06F 11/1451 |
| 2009/0041230 A1* | 2/2009 | Williams ........... G06F 11/1464 380/28 |
| 2010/0186007 A1* | 7/2010 | Jeong ..................... G06F 8/60 717/170 |
| 2010/0242032 A1* | 9/2010 | Ladki ..................... G06F 8/71 717/171 |
| 2010/0325167 A1* | 12/2010 | Landry .............. G06F 11/1446 707/802 |
| 2011/0016361 A1* | 1/2011 | Bass .................. G06F 11/1433 714/48 |
| 2012/0198434 A1* | 8/2012 | Dirstine ................. G06F 8/65 717/170 |
| 2013/0166511 A1* | 6/2013 | Ghatty ................. G06F 16/21 707/649 |
| 2013/0332647 A1* | 12/2013 | Rabeler ................. G06F 8/65 711/103 |
| 2014/0007071 A1* | 1/2014 | Chang ................... G06F 8/654 717/170 |
| 2014/0052330 A1 | 2/2014 | Mitchell et al. |
| 2014/0059534 A1 | 2/2014 | Daum et al. |
| 2014/0195491 A1* | 7/2014 | Ma ....................... G06F 16/11 707/652 |
| 2014/0325500 A1* | 10/2014 | Jang ....................... G06F 8/65 717/173 |
| 2014/0380296 A1 | 12/2014 | Pal et al. |
| 2015/0088370 A1 | 3/2015 | Vangelov |
| 2015/0128123 A1* | 5/2015 | Eling ..................... G06F 8/654 717/171 |
| 2015/0186548 A1 | 7/2015 | Chun et al. |
| 2015/0242198 A1 | 8/2015 | Tobolski et al. |
| 2015/0331686 A1 | 11/2015 | Petersen et al. |
| 2015/0363210 A1 | 12/2015 | Wehrman et al. |
| 2015/0363797 A1 | 12/2015 | Ramesh |
| 2016/0098266 A1 | 4/2016 | Martin et al. |
| 2016/0196132 A1* | 7/2016 | Searle .................. H04L 41/082 717/173 |
| 2016/0217042 A1* | 7/2016 | Wang ................... G06F 16/27 |
| 2016/0246585 A1* | 8/2016 | Li ........................ H04W 8/205 |
| 2016/0323416 A1 | 11/2016 | Wolf |
| 2016/0335073 A1 | 11/2016 | Hong |
| 2016/0371075 A1 | 12/2016 | Moeller et al. |
| 2016/0371077 A1 | 12/2016 | Moeller et al. |
| 2017/0039059 A1 | 2/2017 | Gintz et al. |
| 2017/0046884 A1 | 2/2017 | Liu et al. |
| 2017/0118023 A1 | 4/2017 | Gussen et al. |
| 2017/0123782 A1 | 5/2017 | Choi |
| 2017/0180391 A1 | 6/2017 | Hinchliffe et al. |
| 2017/0075678 A1 | 8/2017 | Sangameswaran et al. |
| 2017/0242678 A1 | 8/2017 | Sangameswaran et al. |
| 2017/0242679 A1 | 8/2017 | Sangameswaran et al. |
| 2019/0014026 A1* | 1/2019 | Bahar ................... B60W 50/00 |
| 2020/0174779 A1* | 6/2020 | David ................... H04L 67/12 |

FOREIGN PATENT DOCUMENTS

| | | |
|---|---|---|
| CN | 103136020 A | 6/2013 |
| CN | 103399760 A | 11/2013 |

(56) References Cited

FOREIGN PATENT DOCUMENTS

| | | |
|---|---|---|
| CN | 103957244 A | 7/2014 |
| CN | 104090800 A | 10/2014 |
| CN | 104539668 A | 4/2015 |
| CN | 104978205 A | 10/2015 |
| CN | 105094932 A | 11/2015 |
| CN | 105278994 A | 1/2016 |
| CN | 105282250 A | 1/2016 |
| CN | 105468385 A | 4/2016 |
| CN | 105589719 A | 5/2016 |
| CN | 103136001 B | 6/2016 |
| CN | 105700905 A | 6/2016 |
| CN | 105824653 A | 8/2016 |
| CN | 105978921 A | 9/2016 |
| CN | 106052699 A | 10/2016 |
| CN | 106066800 A | 11/2016 |
| CN | 106383757 A | 2/2017 |
| CN | 106385420 A | 2/2017 |
| CN | 106411967 A | 2/2017 |
| CN | 106506649 A | 3/2017 |
| CN | 106528207 A | 3/2017 |
| CN | 106656565 A | 5/2017 |
| CN | 106850839 A | 6/2017 |
| CN | 106934868 A | 7/2017 |
| DE | 10 2004 052 782 B4 | 12/2007 |
| DE | 10 2007 062 160 A1 | 6/2009 |
| DE | 10 2005 021 103 B4 | 10/2013 |
| DE | 10 2014 221 972 A1 | 5/2016 |
| DE | 10 2015 207 852 A1 | 11/2016 |
| DE | 10 2016 006 701 A1 | 12/2016 |
| DE | 10 2015 219 837 A1 | 4/2017 |
| DE | 10 2004 064 292 B3 | 5/2017 |
| DE | 10 2016 201 279 A1 | 8/2017 |
| EP | 2 041 632 B1 | 5/2012 |
| EP | 2 424 745 B1 | 4/2013 |
| EP | 3 141 974 A1 | 3/2017 |
| EP | 1 324 197 B1 | 4/2017 |
| FR | 2 865 301 B1 | 1/2005 |
| GB | 2536360 A | 9/2016 |
| JP | 2001-67232 A | 3/2001 |
| JP | 2010125925 A | 6/2010 |
| JP | 2017-149323 A | 8/2017 |
| JP | 6185789 B2 | 8/2017 |
| JP | 2017-157003 A | 9/2017 |
| KR | 10-2001-0027466 A | 4/2001 |
| KR | 100739142 B1 | 7/2007 |
| KR | 100853124 B1 | 8/2008 |
| KR | 101316970 B1 | 10/2013 |
| KR | 10-2014-0086159 A | 7/2014 |
| KR | 10-2014-0105159 A | 9/2014 |
| KR | 10-2015-0144623 A | 12/2015 |
| KR | 101600460 B1 | 3/2016 |
| KR | 10-1619645 B1 | 5/2016 |
| KR | 10-2017-0094765 A | 8/2017 |
| KR | 101822485 B1 | 1/2018 |
| SE | 1051247 A1 | 6/2012 |
| TW | 201537465 A | 10/2015 |
| WO | 98/21077 A1 | 5/1998 |
| WO | 01/71306 A1 | 9/2001 |
| WO | 02/17184 A1 | 2/2002 |
| WO | 03/077205 A2 | 9/2003 |
| WO | 2016/142101 A1 | 9/2016 |
| WO | 2017/010859 A1 | 1/2017 |
| WO | 2017/149824 A1 | 9/2017 |

\* cited by examiner

(PRIOR ART)

ERROR-RESILIENT OVER-THE-AIR SOFTWARE UPDATES FOR VEHICLES

BACKGROUND

Modern-day vehicles include increasing amounts of software. Software is often essential to the proper functioning of the vehicle. In many cases, software is updated from time to time in order to ensure that the vehicle is operating correctly, and/or to reconfigure vehicle functionality that is only changeable by updating the software. This is true in many types of vehicles, including but not limited to Class 8 trucks, other classes of trucks, farm equipment, buses, and passenger cars.

Electronic control units (ECUs) and other devices associated with the vehicles may store or access updatable software, which may include computer-executable instructions, settings data, torque maps, or other software. ECUs are embedded devices that control electronic systems or subsystems in vehicles. ECUs provide many types of functionality for vehicle operation, including but not limited to engine control, auxiliary equipment control, presentation of information via an instrument panel, and infotainment services. ECUs can be implemented in a variety of hardware configurations. A typical ECU includes a processor (e.g., a microcontroller), memory, input/output lines, and one or more communication links. The memory may include an electronically erasable, programmable, read-only memory ("EEPROM") or other non-volatile memory (e.g., flash memory) and/or random access memory ("RAM") for storing program instructions that are accessible by the processor.

Typically, vehicle software stored on the ECU is updated by coupling a specialized device (sometimes referred to as a flash tool or service tool) to a physical communication port of the vehicle, such as an OBD-II port. Once coupled to the physical communication port, the specialized device transmits the software update to the device to be updated via a vehicle network such as a controller area network (CAN) bus or another type of network, and the device is updated. In order to apply the software update using this approach, the vehicle must be taken to a dealership, service center, or other location that offers software update services using the specialized device. Dealerships and service centers where such updates can be installed may not always be closely available to the vehicle, and application of the updates may take an inconvenient amount of time. For example, during a trip, a vehicle requiring such a software update may need to change its route, resulting in a change in itinerary. The change in itinerary may cause shipment delays and increased fuel costs, as well as delays in the installation of critical updates that may affect vehicle performance.

To address these limitations, over-the-air updates have been introduced in which vehicle software on the ECU can be updated wirelessly, without physically connecting the vehicle to a specialized device. In some embodiments, over-the-air updates can be delivered to the vehicle from an update server via a wireless network. The wireless network may be a private wireless network such as a protected Wi-Fi network, or could be a public network such as a 3G network, a 4G network, an LTE network, or any other wireless network, including the Internet. Such embodiments address many of the drawbacks of using a specialized device to update the vehicle software, because the vehicle can be updated at any location in which the vehicle can wirelessly access a network through which it can reach the update server.

Though over-the-air updates do address some of the problems with using a specialized device to provide vehicle software updates, technical problems exist in implementing such systems. For example, allowing software updates to occur outside of a dealership or service center means that the person initiating the software update may not be fully trained or experienced in applying software updates the way a technician in a dealership or service center is. This introduces an additional technical problem, in that the safety and reliability of applying an over-the-air software update is reduced compared to previous techniques that were only performed by skilled technicians. For example, if the updated version of the software is corrupted in some way, or if the update is interrupted before completion, the vehicle may be left in a nonfunctional state that cannot be easily resolved.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a vehicle computer system receives a software update package from a remote computer system via a wireless communication network. The software update package comprises a first software update for a first updatable electronic component (e.g., an electronic control unit (ECU)) of the vehicle. The vehicle computer system installs the first software update in the first updatable electronic component, determines that the installation of the first software update is successful, and, in response to determining that the installation of the first software update is successful, stores the first software update in a storage medium in the vehicle computer system as a current backup software version for the first updatable electronic component. Determining that the installation of the first software update is successful may include receiving an indication that the first updatable electronic component is functioning correctly.

In another aspect, a vehicle computer system performs a method of returning an updatable electronic component (e.g., an ECU) of a vehicle to a functional state after a software update error or interruption. The vehicle computer system receives a software update package (e.g., from a remote computer system via a wireless communication network) comprising a first software update for a first updatable electronic component of the vehicle; determines that a backup software version for the first updatable electronic component is present on a storage medium in the on-board computer system; initiates an installation of the first software update for the first updatable electronic component; detects an error or interruption in the installation of the first software update; cancels the installation of the first software update; retrieves the backup software version from the storage medium; and installs the backup software version in the first updatable electronic component. Prior to initiating the installation of the update, the system may check the backup software version for compatibility with a current configuration of the vehicle. If the system determines that the backup software version is incompatible with the current vehicle configuration, the system may update the backup software version such that the backup software version is compatible with the current vehicle configuration. Steps of the method may be performed without requiring user input, including detecting the error or interruption, suspending the installation of the first software update, retrieving the backup software version, and installing the backup software version.

In another aspect, a vehicle comprises an ECU and a computing device comprising a wireless modem, a processor, and non-transitory computer-readable storage media. The computing device is programmed to perform actions comprising receiving a first software update package from a remote computer system via the wireless modem, wherein the first software update package comprises a first software update for the first ECU; installing the first software update in the first ECU; storing the first software update in the storage media as a current backup software version for the first ECU; receiving a second software update package from the remote computer system via the wireless modem, wherein the second software update package comprises a second software update for the first ECU; initiating an installation of the second software update in the first ECU; detecting an error or interruption in the installation of the second software update; suspending the installation of the second software update; retrieving the current backup software version from the storage media; and reinstalling the current backup software version in the first ECU.

In any of the disclosed embodiments, a vehicle computer system may validate installation of a software update in an updatable electronic component prior to storing the software update as a backup software version. In any of the disclosed embodiments, if a software update package includes multiple software updates (e.g., for multiple updatable electronic components), the vehicle computer system may install and validate multiple software updates and store them as backup versions for the respective updatable electronic components. Storing a software update as a backup software version may include overwriting a previous backup software version for the respective updatable electronic component.

In any of the disclosed embodiments, a vehicle computer system may include a computing device that manages the software update process. The computing device may include a wireless modem, a processor, and a storage medium. The computing device may perform steps of the described processes, such as receiving software update packages and storing the software updates as backup software versions, with or without requiring input from a user.

In any of the disclosed embodiments, a vehicle computer system may check for a valid backup software version prior to installing a software update to facilitate roll-back to a functional state in the event of an error during installation of the software update. For example, the vehicle computer system may check the storage medium for a previously stored backup software version for the first updatable electronic component that is compatible with a current configuration of the vehicle. If no backup software version is present, or if a previously stored backup software version is unavailable (e.g., corrupted) or not compatible with a current configuration of the vehicle, the vehicle computer system may request an updated backup software version (e.g., from a remote computer system) that is compatible with the current vehicle configuration; receive the updated backup software version; and store the updated backup software version in the storage medium. Installation of the software update may be delayed until a compatible backup software version is obtained.

BRIEF DESCRIPTION OF THE DRAWINGS

Non-limiting and non-exhaustive embodiments of the present disclosure are described with reference to the following figures, wherein.

DETAILED DESCRIPTION

Embodiments described herein provide numerous technical benefits over prior techniques. In particular, embodiments described herein employ a local backup approach in which a backup software version, which has been previously stored on the vehicle and checked for validity, is automatically reinstalled in the event that errors or interruptions occur during over-the-air software updates. Described embodiments can reduce or eliminate trips to a dealership or service center to resolve software problems. Furthermore, local storage of the backup software version allows update errors and other software problems to be at least temporarily resolved even where a communication link to a remote server is not available. In some embodiments, this can be done automatically, without requiring any user interaction. This allows the vehicle to be more error-resilient and, in some cases, self-healing with respect to software problems, because user interaction is not required and the vehicle need not be driven to a service center to correct such problems, thereby avoiding altered itineraries and corresponding costs in terms of delays and fuel consumption. Further technical benefits provided by described embodiments are discussed below.

Figure 1:
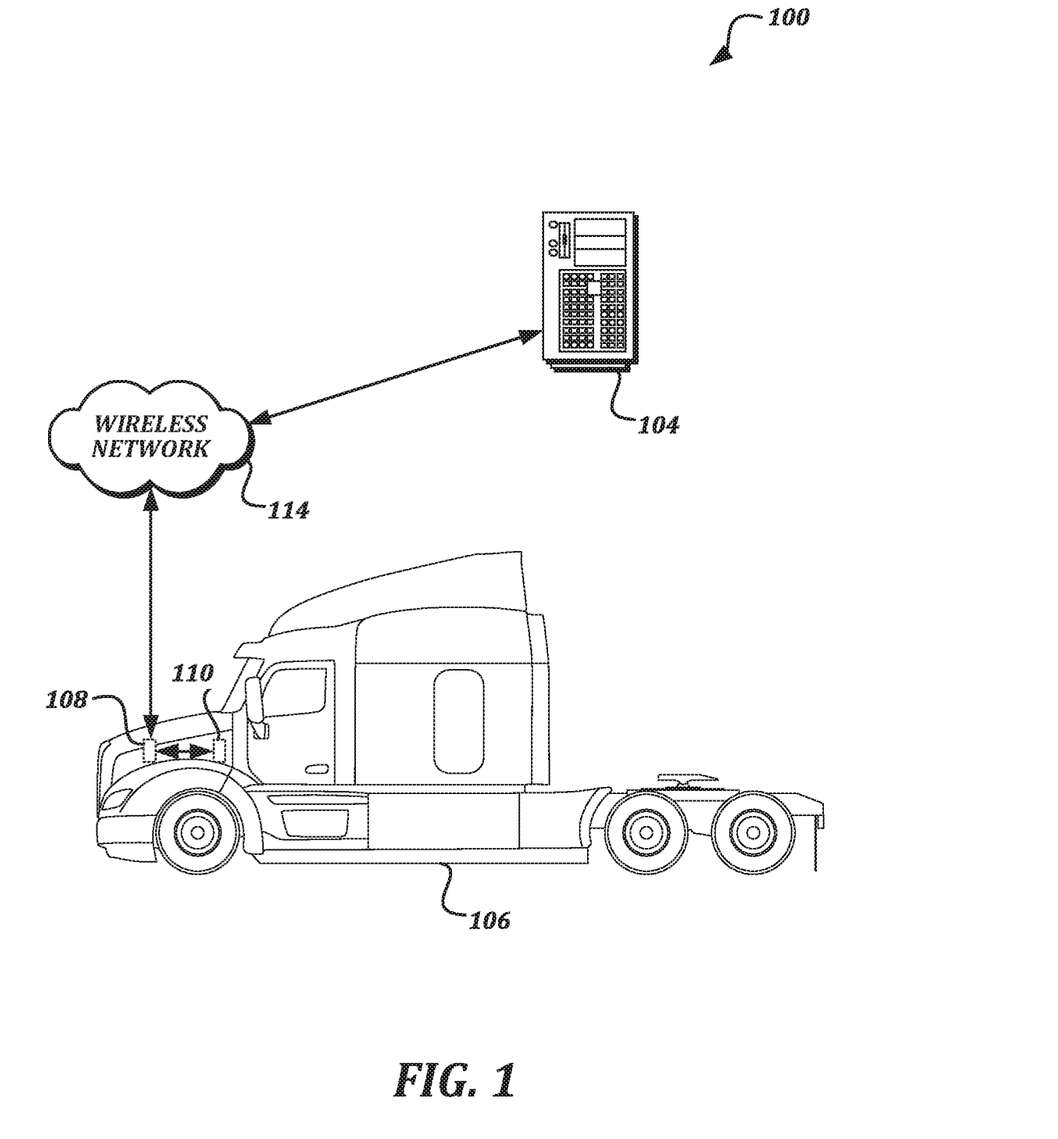
FIG. 1 is a schematic diagram of an example embodiment of an environment in which over-the-air software updates for components of a vehicle are performed according to various aspects of the present disclosure.

FIG. 1 is a schematic diagram of an example embodiment of an environment 100 in which over-the-air software updates for components of a vehicle may be performed according to various aspects of the present disclosure. As applied to software updates, the term "over-the-air" refers to updates provided by a server computing system 104 to a vehicle 106 via one or more wireless networks. Over-the-air wireless updates eliminate the need to provide software updates through a wired, physical connection. Accordingly, over-the-air updates of a vehicle can be performed at any location where the vehicle has a communication link to the one or more wireless networks, without requiring the vehicle to be located at a dealership or service center. However, it should be understood that some embodiments described herein, such as automatic rollback to locally stored backup software, may be adapted to situations where software updates are provided to the vehicle via a physical connection. For example, if an error occurs during a software update provided via a physical connection, automatic roll-back to locally stored backup software may be useful to ensure that the vehicle is returned to a functional state without requiring intervention by a trained technician.

As shown, the environment 100 includes a vehicle 106 and a server computing system 104. The vehicle 106 includes an over-the-air (OTA) updater device 108 and one or more updatable components 110. The OTA updater device 108 is a computing device that may include wireless communication hardware (e.g., a wireless modem that communicates over a cellular network to provide mobile Internet access). As shown, the OTA updater device 108 is integrated in an on-board computer system within the vehicle 106. Alternatively, the OTA updater device 108 may be implemented as a separate computing device that communicates with the vehicle 106. An illustrative OTA updater device 108 is described in further detail below with reference to FIG. 2.

In the example shown in FIG. 1, the OTA updater device 108 communicates with the server computing system 104 via a first wireless network 114 to obtain software updates for the vehicle 106. The software updates may be stored by the server computing system 104 and transmitted to the vehicle 106. Transmission of updates by the server computing system 104 to the vehicle 106 can be achieved in different ways, such as transmitting updates as they become available, at designated times, in response to requests from the vehicle 106, or in some other way. The server computing system 104 may provide such updates directly, or the server computing system 104 may act as an intermediary between the vehicle and some other computer system, such as a dedicated update server (not shown).

The first wireless network 114 may include one or more types of wireless communication technology, including but not limited to a 2G wireless network, a 3G wireless network, a 4G wireless network, an LTE wireless network, a Wi-MAX wireless network, a Wi-Fi wireless network, a satellite-based wireless network, or any suitable network capable of wirelessly transmitting software updates. In some embodiments, the wireless communication hardware of the OTA updater device 108 communicates with the server computing system 104 or other computing systems via the first wireless network 114. In some embodiments, some portions of the first wireless network 114, such as a portion of the first wireless network 114 that is coupled to the server computing system 104, may include wired communication technology including but not limited to an Ethernet local-area network or the Internet. Even in such embodiments, the connection between the vehicle 106 and the first wireless network 114 will be via a portion of the first wireless network 114 that includes a wireless communication technology.

Figure 2:
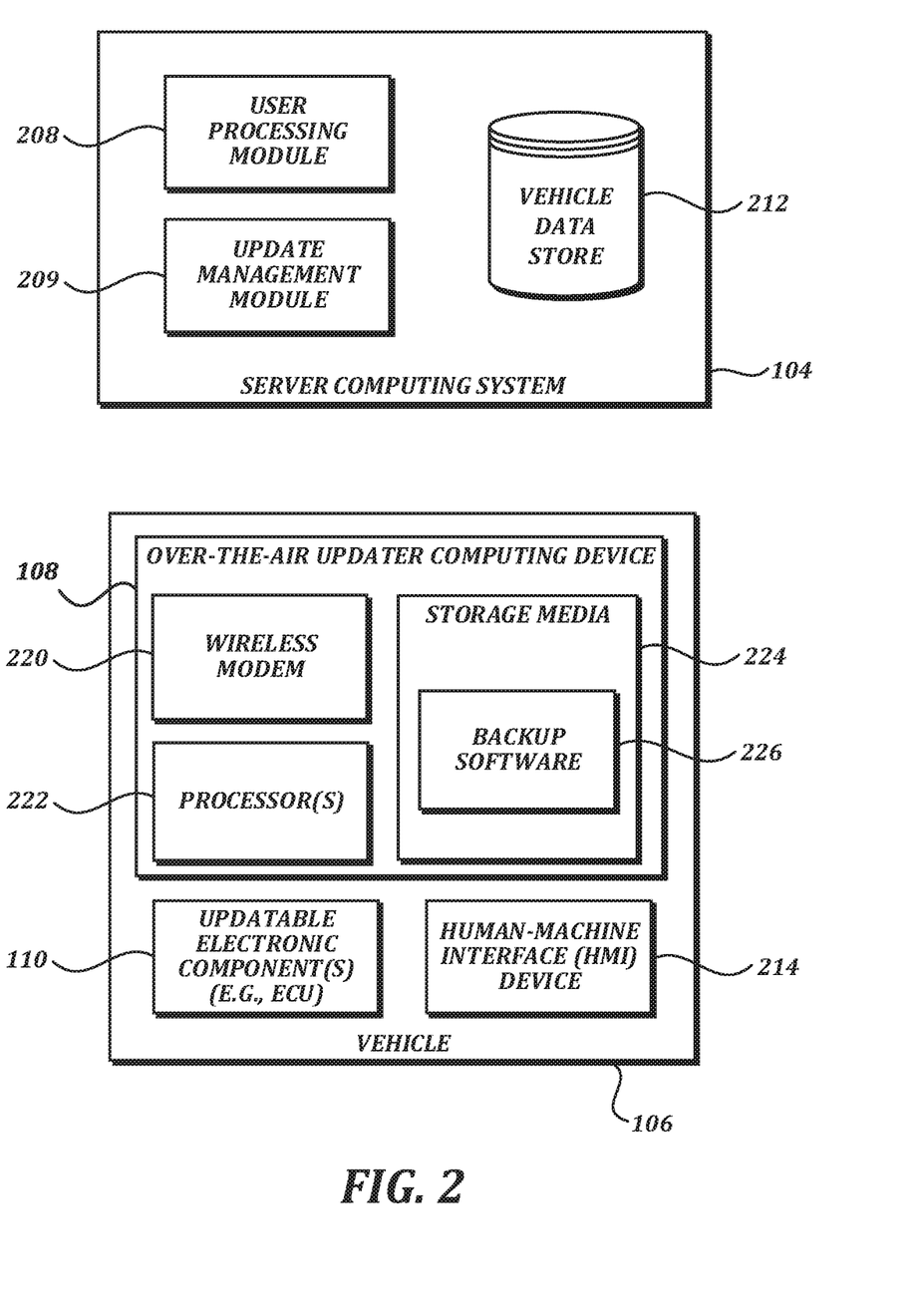
FIG. 2 is a block diagram that illustrates details of various components of the environment illustrated in FIG. 1 according to various aspects of the present disclosure.

FIG. 2 is a block diagram that illustrates details of some components of the environment illustrated in FIG. 1 according to various aspects of the present disclosure. As shown in FIG. 2 (and as previously shown in FIG. 1), the environment includes a server computing system 104 and a vehicle 106.

The vehicle 106 may be any type of vehicle that includes updatable electronic components having updatable software). In some embodiments, the vehicle 106 is a Class 8 truck or another type of vehicle, such as another class of truck, a bus, a passenger car, or a motorcycle. In the example shown in FIG. 2, the vehicle 106 includes an OTA updater device 108, one or more updatable electronic components 110, and a human-machine interface (HMI) device 214. Though not illustrated, the components of the vehicle 106 may communicate with each other using a vehicle communication bus. Any suitable vehicle communication bus, such as a controller area network (CAN) bus, may be used.

The OTA updater device 108 performs actions for updating software within the vehicle 106. In some embodiments, the OTA updater device 108 obtains software updates. For example, the OTA updater device 108 may receive a software update package from a remote computer system such as the server computing system 104. The software update package may include one or more software updates for one or more updatable electronic components 110, and may also include additional content such as update instructions and authentication information.

In some embodiments, the OTA updater device 108 stores backup software versions for the updatable electronic component(s) 110. As described in further detail below, the OTA updater device 108 may confirm that a backup software version for a particular component is present and compatible with a present vehicle configuration before attempting to install an update for that component. An initial backup software version may be stored in the OTA updater device 108 as part of a registration process for OTA updates. The initial backup software version may be updated over time, as described in detail below.

In some embodiments, the OTA updater device 108 applies the software update(s) to the updatable electronic component 110 and, after verifying that the updated software is valid and functioning properly, stores the updated software on the vehicle 106 as backup software versions. These backup versions can be used in the event of errors or interruptions in future updates that require reverting or "rolling back" to a previous software version, as described in further detail below.

In some embodiments, the OTA updater device 108 receives commands from the server computing system 104 regarding the availability of one or more software updates, and installs the one or more software updates in response to such commands. In some embodiments, the OTA updater device 108 communicates information to the server computing system 104, such as vehicle identification information, device identification information, and vehicle status information. This information can be used to authenticate the OTA updater device 108 and the vehicle 106 to ensure that the updates are carried out accurately, safely, and securely.

In some embodiments, the OTA updater device 108 also includes a wireless modem 220, one or more processors 222, and storage media 224 on which backup software 226 for the updatable electronic component(s) 110 may be stored. In some embodiments, the backup software 226 is a copy of software currently installed on the updatable electronic component(s) 110. As described in further detail below, when the software installed on the updatable electronic components(s) 110 is updated and confirmed to be valid and functioning correctly, the backup software 226 can then be overwritten with the updated software. In this way, the backup software 226 is kept up to date.

Storing the updatable electronic component backup software 226 on the vehicle 106 provides numerous technical benefits. For example, if software on the updatable electronic component 110 becomes corrupted or if a software update for the updatable electronic component 110 is unsuccessful, the vehicle 106 can retrieve and install a backup software version from the storage media 224 to allow the updatable electronic component 110 to remain functional. This allows the vehicle 106 to be self-healing and error-resilient with respect to software problems, because user interaction is not required and the vehicle need not be driven to a service center to correct such problems, thereby avoiding altered itineraries and corresponding costs in terms of delays and fuel consumption. Described embodiments can reduce or eliminate trips to a service center to resolve software or software installation problems. Furthermore, local storage of the backup software version allows update errors and other software problems to be at least temporarily resolved even where a communication link to a remote server is no longer available. For example, a software update may be downloaded to the OTA updater device 108 via a communication link, but if the communication link is lost during installation, the OTA updater device 108 can obtain the backup software version from local storage and install it without communicating with a remote server. In some embodiments, this can be done automatically, without requiring any user interaction.

The updatable electronic component 110 is any component within the vehicle 106 having computer-executable instructions, data, or other software stored thereon that can be updated. As an example, the updatable electronic component 110 may be an ECU. In some embodiments, the updatable electronic component 110 includes a non-transitory computer-readable medium, which may be a stand-alone computer-readable medium, such as a flash memory. The computer-readable medium also may form part of another component, such as firmware or other memory. The entire firmware or memory of the updatable electronic component need not be updated; rather, only a targeted or specific portion may be updated. Though only a single updatable electronic component 110 is illustrated in FIG. 2 for ease of discussion, the vehicle 106 may have two or more updatable electronic components 110.

In the example shown in FIG. 2, the HMI device 214 is a device that accepts input from the operator of the vehicle 106. Any suitable device may be used as the HMI device 214, including but not limited to a push button, a toggle switch, a lever, and a touch-sensitive display. In some embodiments, a dedicated HMI device 214 (such as a push button, toggle switch, lever, or touch-sensitive display interface that is only associated with the software update initiation functionality) is provided in the vehicle 106 for initiating software update functionality. In some embodiments, an existing HMI device 214 within the vehicle 106 may be used to initiate the software update functionality. For example, in some embodiments, a cruise control set button may be an existing HMI device 114 that can be used to initiate software update functionality. In such embodiments, the cruise control set button may be depressed for a threshold amount of time, such as three seconds, in order to activate software update functionality.

The HMI device 214 is optional. Although the illustrative HMI device 214 is referred to herein as a "human-machine interface" device, it should be understood that embodiments described herein may be used in situations where human users are not interacting with devices on the vehicle. For example, embodiments described herein may be used to provide updates to human-operated vehicles without requiring interaction, knowledge, or approval from the human operator. As another example, embodiments described herein may be used to provide updates to autonomous vehicles in which no human operators are present, or to vehicles that are configured for autonomous operation in some scenarios and human operation in other scenarios. Unless otherwise specified, processes described herein or portions thereof may be performed automatically without requiring interaction, knowledge, or approval from a human user.

In some embodiments, the server computing system 104 includes one or more computing devices capable of communicating with the first wireless network 114 and performing actions described herein. Any suitable computing device may be included in the server computing system 104. Typically, the one or more computing devices of the server computing system 104 include desktop computing devices, rack-mounted computing devices, and/or cloud computing systems. In some embodiments, the computing devices of the server computing system 104 are hosted in a single data center. In some embodiments, the computing devices of the server computing system 104 are located in more than one data center, and communicate with each other via one or more networks.

As shown, the server computing system 104 includes a user processing module 208, an update management module 209, and a vehicle data store 212. In some embodiments, the user processing module 208 authenticates computing devices connecting to the server computing system 104 in order to permit them to interact with the server computing system 104. In some embodiments, the user processing module 208 provides functionality for associating users or devices with vehicles 106, and may also verify that an authenticated user (e.g., an operator of the vehicle 106 or a user of some other computing device that interacts with the server computing system 104) is associated with a vehicle 106 to be updated. In some embodiments, the user processing module 208 queries a vehicle data store 212, which stores the associations between users and vehicles 106, for vehicles associated with an authenticated user.

The update management module 209 communicates with the OTA updater device 108 and the vehicle data store 212, and manages the update process at the server computing system 104, including transmitting software updates to the vehicle 106. To this end, the vehicle data store 212 may store software updates or related packages to be provided to the vehicle 106. The vehicle data store 212 also may store information such as the current software versions of components of the vehicle. This information can be useful for determining whether updatable electronic components of the vehicle 106 may require a software update. The vehicle data store 212 also may store vehicle configuration information, which may be useful for determining whether a particular software version is compatible with a current vehicle configuration.

Although the illustrative module 208 is referred to herein as a "user" processing module, it should be understood that embodiments described herein may be used in situations where human users are not directly involved in the update process, as noted above. For example, embodiments described herein may be used to provide updates to human-operated vehicles without requiring interaction from the human operator. As another example, embodiments described herein may be used to provide updates to autonomous vehicles in which no human operators are present.

Figure 3:
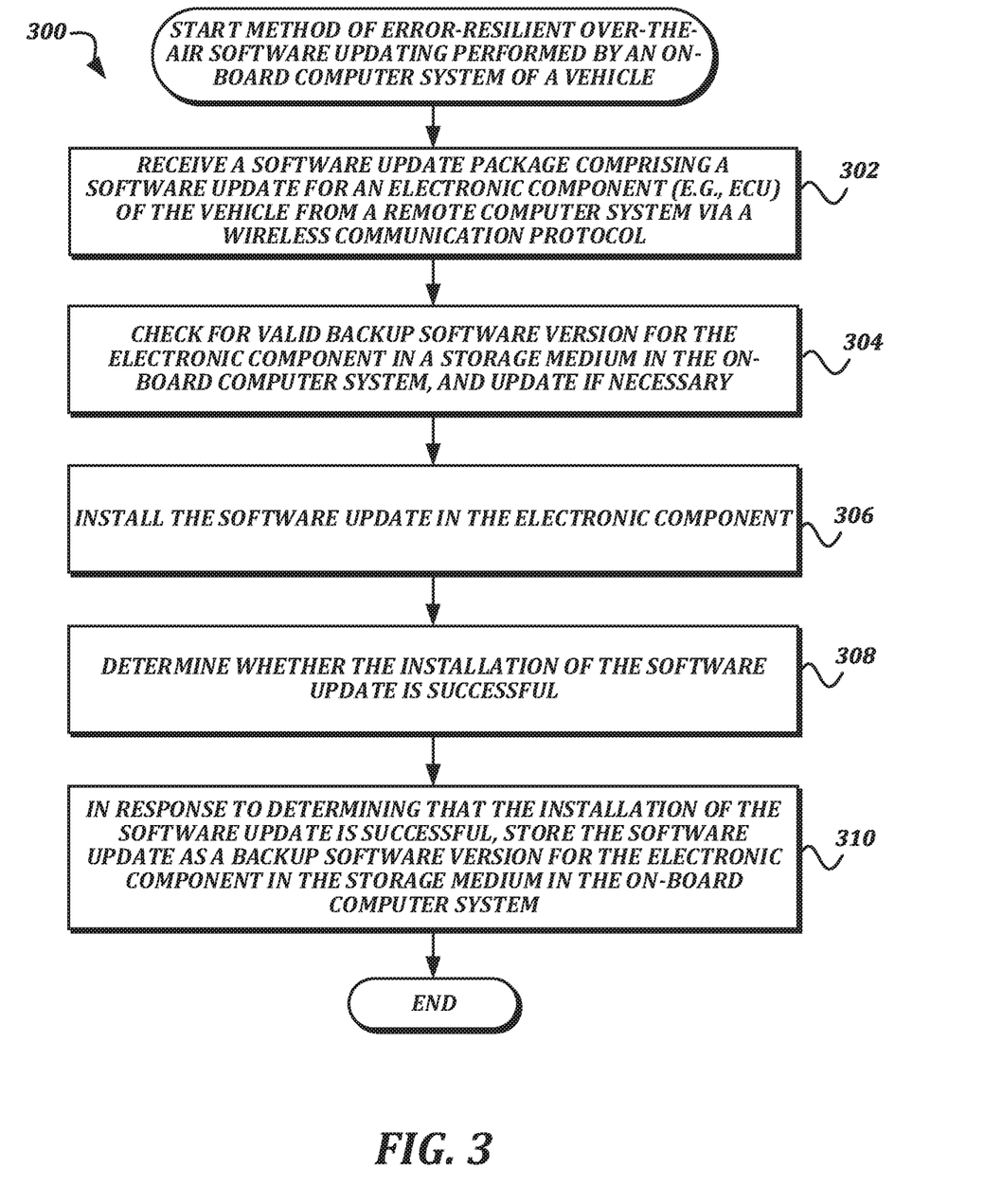
FIGS. 3 and 4 are flowcharts that illustrate example methods of error-resilient software updating for a vehicle according to various aspects of the present disclosure.

FIG. 3 is a flowchart of an illustrative method 300 of error-resilient software updating for a vehicle, according to various aspects of the present disclosure. In this example, the method 300 is described as being performed by an OTA updater device 108 on board the vehicle, but the method 300 also may be performed or managed by some other computing device or set of devices that are on board or remote from the vehicle. As mentioned above, the OTA updater device 108 may be implemented as a computing device that includes a wireless modem for sending and receiving data, including software updates; one or more processors, and a storage medium that acts as a backup location on the vehicle.

In this illustrative embodiment, the OTA updater device 108 manages the update process and causes the newly installed software to be copied to the backup location on the vehicle in order to provide the ability to revert or "roll back" to the version stored at the backup location in the event of, for example, an error or interruption during a future software update.

At block 302, the OTA updater device 108 of a vehicle 106 receives a software update package from a remote computer system (e.g., server computing system 104) via a wireless communication network according to a particular wireless communication protocol. The software update package includes a software update for an updatable electronic component (e.g., an ECU) of the vehicle. The software update may provide, for example, improved functionality for any feature that may be controlled by updatable software of an ECU or some other updatable electronic component of a vehicle, including but not limited to engine control systems, braking systems, cruise control systems, anti-collision systems, and the like. In some embodiments, the software update includes computer-executable instructions, settings, data, or other software that will replace or update software stored on the updatable electronic component. In some embodiments, the software update package or the software update itself may also include other information, including but not limited to version information, prerequisite information, and instructions for the OTA updater device 108 regarding how to install the software on the updatable electronic component. Though the discussion herein primarily refers to obtaining a single software update for a single updatable electronic component, for ease of discussion, in some embodiments, the OTA updater device 108 may obtain more than one software update for a single updatable electronic component, or software updates for multiple updatable electronic components.

The OTA updater device 108 may obtain the software update in any suitable manner. For example, the OTA updater device 108 may transmit a request for available updates to the server computing system 104 (or another computing system), and may receive the software update in response, or the OTA updater device 108 may receive an indication that a software update is available. As another example, the server computing system 104 (or another computing system) may push the software update to the OTA updater device 108, or may otherwise cause the OTA updater device 108 to initiate a download of the software update. As a possible alternative to the OTA updater device 108 receiving software updates directly via wireless communication, software updates may, in some examples, be copied to the OTA updater device 108 from a computer-readable storage medium coupled to the vehicle 106.

In response to receiving the software update, the OTA updater device 108 may temporarily store the software update until the OTA updater device 108 initiates installation of the software update. The OTA updater device 108 also may perform other actions prior to installation of the update. For example, the OTA updater device 108 may transmit a notification (e.g., to the remote computer system) that the software update has been obtained, a notification regarding whether the vehicle is in an appropriate state for installation, etc.

Referring again to FIG. 3, at block 304, the OTA updater device 108 checks for a valid backup software version for the updatable electronic component in a storage medium in the on-board vehicle computer system, and updates the backup software version if necessary. An update of the backup software version at this stage may be necessary or desirable in several situations. For example, if the OTA updater device detects that there is no backup software version present, or if the backup software version is not compatible with a current vehicle configuration, the OTA updater device 108 may obtain and store an updated backup software version in the storage medium before initiating installation of the software update to facilitate reversion to a prior software version in the event of an error during installation of the new software update. In some embodiments, an initial backup software version is obtained for updatable electronic components of the vehicle as part of an initial registration process for OTA updates. These initial backup software versions may be provided by, for example, the vehicle manufacturer. Although it may be expected that this initiation process will have been carried out correctly, an initial check may be performed to ensure that a backup software version is present before attempting to install the software update.

The OTA updater device 108 may obtain the updated backup software version in any suitable manner. For example, the OTA updater device 108 may transmit a request for a backup software version that is compatible with a present vehicle configuration to the server computing system 104 (or another computing system), and may receive the updated backup software version in response.

At block 306, the OTA updater device 108 initiates installation of the software update in the updatable electronic component. This step may involve, for example, determining whether the updatable electronic component is ready to be updated, transmitting the software update from the OTA updater device 108 to the updatable electronic component (e.g., via a communication bus, such as a CAN bus), and executing the installation process on the updatable electronic component.

In some embodiments, the OTA updater device 108 receives information that can be used to determine the vehicle state conditions from other components of the vehicle 106 via the vehicle communication bus to determine whether the vehicle 106 is ready to be updated and that it is safe for the update to proceed. Non-limiting and non-exclusive examples of vehicle state conditions that may be monitored to determine whether installation is ready to begin include whether the HMI device 214 of the vehicle has been actuated for a threshold amount of time, whether the engine of the vehicle 106 is off, whether an ignition key of the vehicle 106 is in an "on" position, whether a battery voltage of the vehicle 106 meets a battery voltage threshold to allow for successful updating, whether a wireless signal strength detected by the OTA updater device 108 meets a signal strength threshold, whether the vehicle speed is zero, and whether a parking brake of the vehicle 106 is set.

Vehicle state conditions also may be monitored during the update process. In some embodiments, if one or more of these conditions changes (e.g., the engine is turned on, the parking brake is released, the key is turned to an "off" position, the battery voltage declines below a threshold, etc.), the update may be paused and resumed in response to determining that each of the conditions is at an acceptable state for installation.

At block 308, the OTA updater device 108 determines whether the installation of the software update was successful. The step of determining whether installation of a software update was successful may involve requesting or waiting for an acknowledgement signal from the ECU that the installation is complete and that the ECU is functioning properly. If more than one component is being updated, the acknowledgement signals may indicate separate results for separate components. This step may be useful to ensure that the update is actually reliable before it is stored as a backup. The OTA updater device 108 may also transmit notifications to other devices, such as the remote computer system, indicating whether the installation was successful. Those devices may then take further action, such as attempting another update if the installation was not successful. The OTA updater device 108 may, with or without user interaction, perform a rollback to a backup version if the installation was not successful, as described in further detail with reference to FIG. 4, below.

At block 310, in response to determining that the installation of the software update was successful, the OTA updater device 108 stores the software update as a backup software version in a storage medium in the on-board computer system, and the method ends. If a previous backup software version for the updatable electronic component has been stored in the storage medium, this step may involve overwriting the previous backup software version. Alternatively, multiple backup versions can be stored. In some embodiments, the software update package may include updates for multiple components. If so, the OTA updater device 108 may install the one or more additional software updates in one or more additional updatable electronic components. For these additional updates, the OTA updater device 108 may determine whether the installation was successful, and store any of those successful updates as backup software versions for the respective components.

Figure 4:
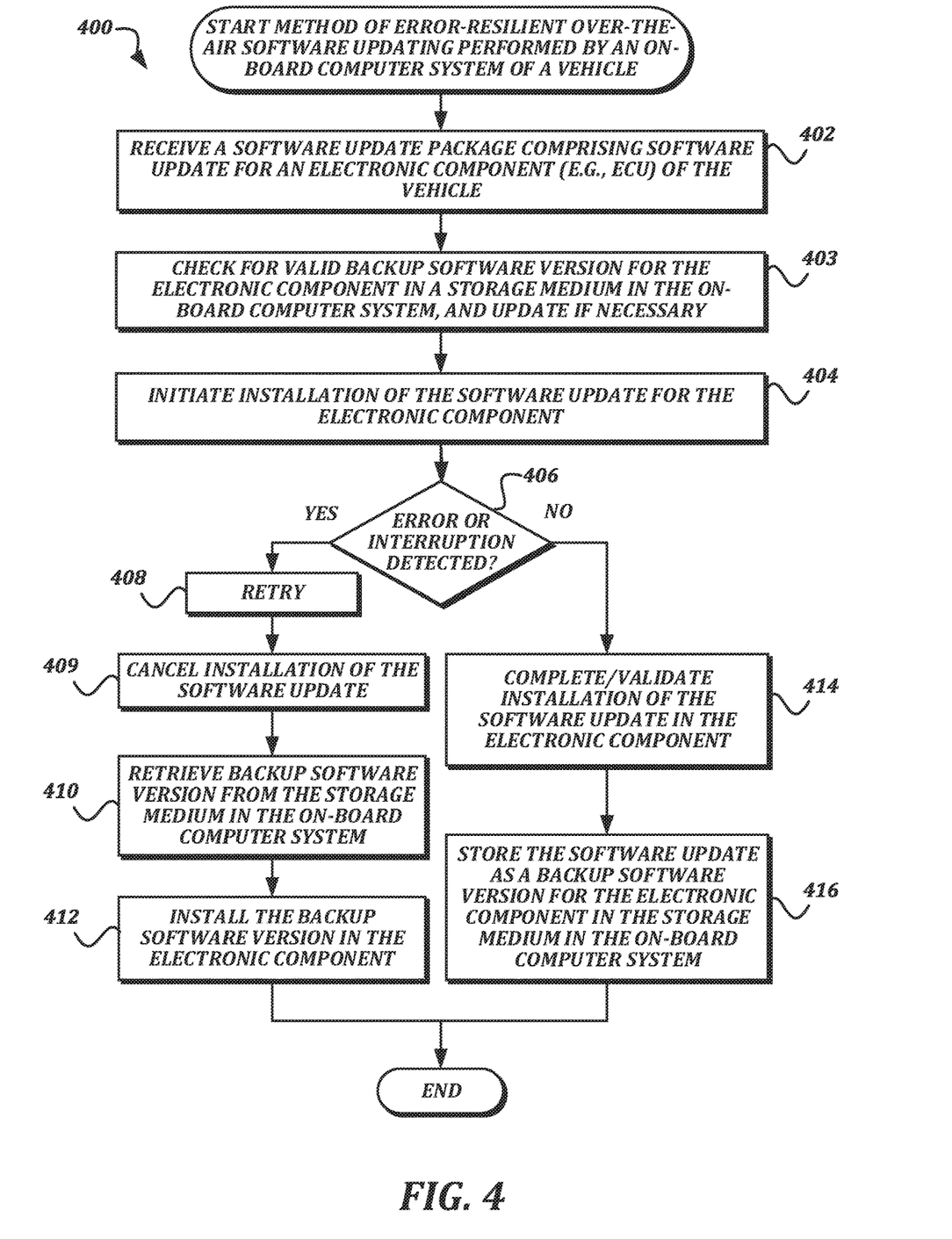

FIG. 4 is a flowchart of an illustrative method 400 of error-resilient software updating for a vehicle, according to various aspects of the present disclosure. In this example, the method 400 is described as being performed by an OTA updater device 108 on board the vehicle, but the method also may be performed or managed by some other computing device or set of devices that are on board or remote from the vehicle. As mentioned above, the OTA updater device 108 may be implemented as a computing device that includes a wireless modem for sending and receiving data, including software updates; one or more processors, and a storage medium that acts as a backup location on the vehicle.

In this illustrative embodiment, the OTA updater device 108 manages the update process and causes the newly installed software to also be copied to the backup location on the vehicle if the update is successful. The copying of the newly installed software to the backup location may involve overwriting a previously stored backup version. If, on the other hand, an interruption or error is detected during installation of the current update, installation of the current update can be suspended and a previously stored backup version of the software can be installed.

At block 402, the OTA updater device 108 of a vehicle 106 receives a software update package (e.g., from a remote computer system such as server computing system 104 via a wireless communication network). The software update package includes a software update for an updatable electronic component (e.g., an ECU) of the vehicle. As described above with reference to FIG. 3, in some embodiments the software update includes computer-executable instructions, settings, data or other software that will replace or update software stored in the updatable electronic component. In some embodiments, the software update package or the software update itself may also include other information, including but not limited to version information, prerequisite information, and instructions for the OTA updater device 108 to install the software on the updatable electronic component. Though the discussion herein primarily refers to obtaining a single software update for a single updatable electronic component for ease of discussion, in some embodiments, the OTA updater device 108 may obtain more than one software update for a single updatable electronic component, or software updates for multiple updatable electronic components.

As described above with reference to FIG. 3, the OTA updater device 108 may obtain the software update in any suitable manner. As described with reference to FIG. 3, after receiving the software update, the OTA updater device 108 may temporarily store the software update until installation of the software update is initiated, and also may perform other actions prior to installation of the update, such as transmitting notifications, determining vehicle state conditions, and the like.

At block 403, the OTA updater device 108 checks for a valid backup software version for the updatable electronic component in a storage medium in the on-board vehicle computer system, and updates the backup software version if necessary. This check may be performed periodically (e.g., every 24 hours), prior to each update installation, or at some other time. As noted above, an update of the backup software version at this stage may be necessary or desirable in several situations. For example, if the OTA updater device detects that there is no backup software version present, or if the backup software version is not compatible with a current vehicle configuration, the OTA updater device 108 may obtain and store an updated backup software version in the storage medium before initiating installation of the software update to facilitate reversion to a prior software version in the event of an error during installation of the new software update. The OTA updater device 108 may obtain the updated backup software version in any suitable manner. For example, the OTA updater device 108 may transmit a request for a backup software version that is compatible with a present vehicle configuration to the server computing system 104 (or another computing system), and may receive the updated backup software version in response.

For compatibility, this check may involve, for example, transmitting backup software version information and vehicle configuration information to a remote server (e.g., to the update management module 209 of the server computing system 104) that stores compatibility records. In some embodiments, the update management module 209 accesses backup software version information and vehicle configuration information stored in the vehicle data store 212 and compares the backup software version with the current vehicle configuration to determine whether the backup software version is compatible with the current vehicle configuration. If more than one component is being updated, or if more than one update is being applied, this process may involve transmitting backup software version information for separate software updates and/or separate components. If the backup software version is incompatible with the current vehicle configuration, the OTA updater device 108 may request an updated backup software version such that the backup software version is compatible with the current vehicle configuration. The OTA updater device 108 may delay the installation of the first software update until a compatible backup software version is obtained. These steps may be useful, for example, in situations where the vehicle configuration has changed since the backup software version was stored, to improve error resilience by ensuring that the backup software version is appropriate for the current vehicle configuration before the installation proceeds.

In an alternative example where the backup software version is determined to be missing, the OTA updater device 108 may perform an initial check to determine whether the backup software version is present. If the backup software version is not present, the OTA updater device 108 may request a backup software version from another source (e.g., a remote computer system). If more than one component is being updated, or if more than one update is being applied, this process may involve checking for multiple backup software versions. The OTA updater device 108 may delay the installation of the first software update until a backup software version is obtained. These steps may be useful, for example, to improve error resilience by ensuring that a backup software version is present before the installation of an update proceeds.

At block 404, the OTA updater device 108 initiates installation of the software update in the updatable electronic component. As noted above with reference to FIG. 3, this step may involve, for example, determining whether the updatable electronic component is ready to be updated, transmitting the software update from the OTA updater device 108 to the updatable electronic component (e.g., via a communication bus, such as a CAN bus), and executing the installation process at the updatable electronic component.

At block 406, the OTA updater device 108 determines whether any errors or interruptions have occurred during the installation process. For example, the OTA updater device 108 may determine that a vehicle state condition has changed such that the installation must be interrupted (e.g., the key has been turned off or the battery level has dropped below a threshold voltage), or that a user has interrupted the update manually. If the installation of the update fails or is interrupted, the installation may be retried at block 408 (e.g., up to a specified number of attempts, such as 5 attempts). If the installation cannot be completed successfully (e.g., if a specified number of attempts has been reached without success, or if a user has canceled the update process), the method proceeds to block 409, where the OTA updater device cancels installation of the software update.

At block 410, the OTA updater device 108 retrieves a backup software version from a storage medium in the on-board computer system. At block 412, the OTA updater device 108 installs the backup software version on the updatable electronic component. As with other installations and updates, the installation of the backup software version may be monitored and validated. If the installation of the backup software version fails, the installation may be retried (e.g., up to a specified number of attempts, such as 5 attempts). If the installation of the update and the backup software version both fail, and the updatable electronic component becomes nonfunctional, the vehicle computer system may notify the operator about the problem (e.g., via an operator interface in the vehicle). The vehicle computer system may also determine whether the vehicle is operational or must be towed to a service center. If assistance is needed, the vehicle computer system may send a notification to a remote computer system, instruct the operator to call a service center, or take some other action.

Referring again to decision block 406, if the installation can be completed successfully, the method proceeds to block 414, where the OTA updater device 108 completes and validates installation of the software update in the updatable electronic component. Validation of the installation may involve receiving, by the OTA updater device 108, an acknowledgement signal from the ECU that the installation is complete and that the ECU is functioning properly. If more than one component is being updated, or if more than one update is being applied, the acknowledgement signals may indicate separate results for separate software updates and/or separate components. This step may be useful to ensure that the update is reliable (i.e., the updated component is functioning properly) before the update is stored as a backup. The OTA updater device 108 may also transmit notifications to other devices, such as the remote computer system, indicating whether the installation was successful. Those devices may then take further action, such as attempting another update if the installation was not successful.

Once the installation of the update has been completed and validated at block 414, the method then proceeds to block 416, where the OTA updater device 108 stores the software update as a backup software version in a storage medium in the on-board computer system. If a previous backup software version for the updatable electronic component has been stored on the storage media, this step may involve overwriting the previous backup software version. Alternatively, multiple backup versions may be stored.

As noted above, in some embodiments the software update package may include updates for multiple components. In such embodiments, process steps described herein may be repeated for additional updates or components. For example, with reference to FIG. 4, blocks 403 to 416 may be repeated for additional updates. If an individual update in the package is completed successfully, and another update in the package is unsuccessful, the component that was not successfully updated may be rolled back to a backup software version, but the component that was successfully updated need not be rolled back to its corresponding backup software version. However, in some embodiments, an unsuccessful installation of a first update may result in cancellation of additional updates in the update package.

To improve vehicle autonomy, error resilience and self-healing aspects of the methods described herein, process steps described herein may be performed automatically without requiring user input. For example, having determined that a valid backup software version for a particular ECU is already stored locally in the OTA updater device 108, the system need not ask a user to approve a step of reverting to the backup software version if an update of the ECU is unsuccessful. In some embodiments, the vehicle computer system performs at least the steps of detecting the error or interruption, suspending the installation of the first software update (if necessary), retrieving the backup software version, and installing the backup software version automatically without requiring user input. Although user input may not be required, the system may still be responsive to user input when carrying out such steps. For example, the system may provide a notification that a roll-back will be performed after encountering an error in the update process. In such a scenario, the steps of retrieving and installing the backup software version may be delayed if user input is received from an HMI device (e.g., within a set time period after providing the corresponding notification) indicating the user's desire to retry the installation process before rolling back to a previous version. In some embodiments, initiating the installation may require user input (e.g., via an operator interface of the vehicle), whereas all other steps of the methods 300 and 400 are performed automatically without requiring user input. In some embodiments, all steps of the methods 300 and 400 are performed automatically without requiring user input.

To improve vehicle autonomy, error resilience (including adapting to lost cellular connections) and self-healing aspects of the methods described herein, process steps described herein may be performed without a communication link to any remote computer systems. In some embodiments, receiving the software update may involve a communication link to a remote computer system, whereas all other steps of the methods 300 and 400 may be performed automatically without requiring user input. In some embodiments, such as where a software update is initially received via a wired connection, all steps of the methods 300 and 400 may be performed without a communication link to any remote computer systems.

Figure 5:
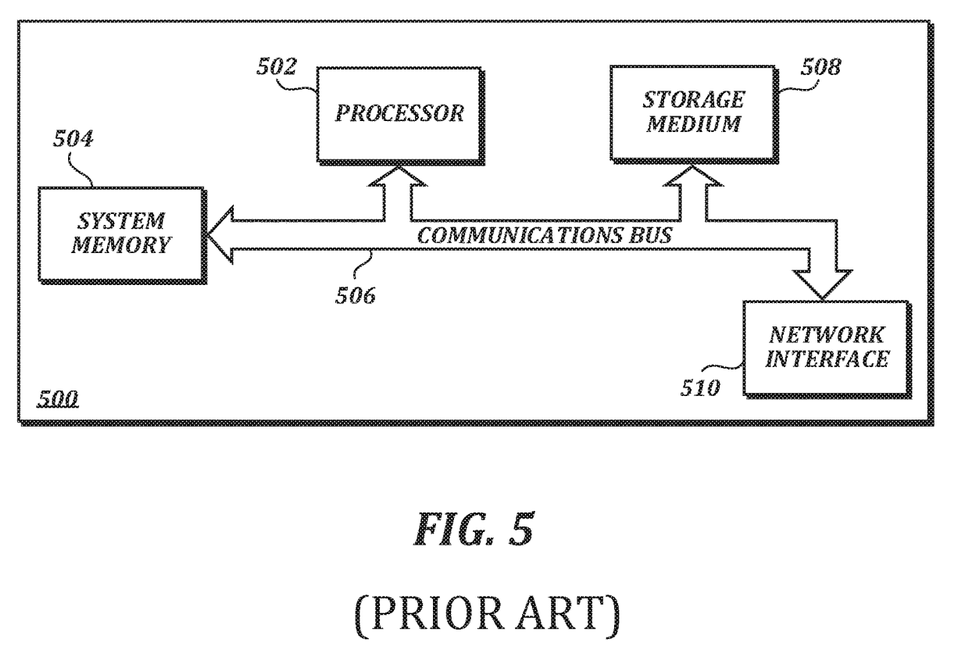
FIG. 5 is a block diagram that illustrates aspects of an exemplary computing device appropriate for use with embodiments of the present disclosure.

FIG. 5 is a block diagram that illustrates aspects of an exemplary computing device 500 appropriate for use with embodiments of the present disclosure. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface that communicates via one or more wireless communication protocols, such as Wi-Fi, 2G, 3G, LTE, WiMAX, Bluetooth, and/or the like.

In the exemplary embodiment depicted in FIG. 5, the computing device 500 also includes a storage medium 508. However, services may be accessed using a computing device that does not include means for persisting data to a local storage medium. The storage medium 508 may be volatile or nonvolatile, removable or nonremovable, implemented using any technology capable of storing information such as, but not limited to, a hard drive, solid state drive, flash memory, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media. Computer-readable media can be used to store data for use by programs.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, and/or the like. Such input devices may be coupled to the computing device 500 by wired or wireless connections including RF, infrared, serial, parallel, Bluetooth, USB, or other suitable protocols using wireless or physical connections. Similarly, the computing device 500 may also include output devices such as a display, speakers, printer, etc.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used.

Further, these figures may graphically represent code to be programmed into a computer-readable storage medium associated with a computing device.

In general, the word "module," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Swift, Go, and/or the like. A module may be compiled into executable programs or written in interpreted programming languages. Software modules may be callable from other modules or from themselves. Generally, the modules described herein refer to logical modules that can be merged with other modules, or can be divided into sub-modules. The modules can be stored in any type of computer-readable medium or computer storage device and be stored on and executed by one or more processors of an ECU or other computing device, thus creating a special purpose computer configured to provide the module. Thus, the term "module" as used herein may be shorthand for one or more processors and a computer-readable medium having computer-executable instructions stored thereon that, in response to execution by the one or more processors, cause the one or more processors to perform the actions described as being performed by the module.

A "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner, such as files in a file system on a computer-readable storage medium.

While illustrative embodiments have been illustrated and described, it will be appreciated that various changes can be made therein without departing from the spirit and scope of the disclosure.

What is claimed is:

1. A non-transitory computer-readable medium having computer-executable instructions stored thereon that, in response to execution by one or more processors of a vehicle computer system of a vehicle, cause the vehicle computer system to perform actions comprising:
- receiving a software update package from a remote computer system via a wireless communication network, wherein the software update package comprises a first software update for a first updatable electronic component of the vehicle;
- after receiving the software update package and prior to installing the first software update:
  - checking a storage device of the vehicle for a previously stored backup software version for the first updatable electronic component;
  - determining that the previously stored backup software version is not compatible with a current configuration of the vehicle; and
  - in response to determining that the previously stored backup software version is not compatible with the current configuration of the vehicle, and prior to determining that the previously stored backup software version is to be re-installed:
    - requesting a compatible backup software version;
    - receiving the compatible backup software version; and
    - storing the compatible backup software version in the storage device of the vehicle;
- installing, only after storing the compatible backup software version, the first software update in the first updatable electronic component;
- determining that the installation of the first software update is successful; and
- in response to determining that the installation of the first software update is successful, storing the first software update in a storage medium in the vehicle computer system as a current backup software version for the first updatable electronic component.

2. The non-transitory computer-readable medium of claim 1, wherein storing the first software update as the current backup software version comprises overwriting the compatible backup software version for the first updatable electronic component.

3. The non-transitory computer-readable medium of claim 1, wherein the vehicle computer system comprises a computing device including a wireless modem, a processor, and the storage medium, and wherein the computing device performs at least the steps of receiving the software update package and storing the first software update as the current backup software version.

4. The non-transitory computer-readable medium of claim 1, wherein the first updatable electronic component comprises an electronic control unit (ECU).

5. The non-transitory computer-readable medium of claim 1, wherein determining that the installation of the first software update is successful comprises receiving an indication that the first updatable electronic component is functioning correctly.

6. The non-transitory computer-readable medium of claim 1, wherein the software update package comprises a second software update for a second updatable electronic component of the vehicle, the actions further comprising:
- installing the second software update in the second updatable electronic component;
- determining that the installation of the second software update is successful; and
- in response to determining that the installation of the second software update is successful, storing the second software update as a backup software version for the second updatable electronic component.

7. A method of returning an updatable electronic component of a vehicle to a functional state after a software update error or interruption, the method comprising, by an on-board computer system of the vehicle:
- receiving a software update package comprising a first software update for a first updatable electronic component of the vehicle;
- determining, after receiving the software update package and prior to installing the first software update, that a backup software version for the first updatable electronic component is present on a storage medium in the on-board computer system;
- determining that the backup software version is not compatible with a current configuration of the vehicle; and
- in response to determining that the backup software version is not compatible with the current configuration of the vehicle, and prior to determining that the previously stored backup software version is to be re-installed:
  - requesting a compatible backup software version;
  - receiving the compatible backup software version; and
  - storing the compatible backup software version in the storage medium;
- initiating, only after storing the compatible backup software version, an installation of the first software update for the first updatable electronic component;
- detecting an error or interruption in the installation of the first software update;
- canceling the installation of the first software update;
- retrieving the compatible backup software version from the storage medium; and
- installing the compatible backup software version on the first updatable electronic component.

8. The method of claim 7, wherein requesting and receiving the compatible backup software version comprises requesting and receiving the compatible backup software version from a remote server.

9. The method of claim 7, wherein the on-board computer system comprises a computing device including a wireless modem, a processor, and the storage medium, and wherein the computing device performs at least the steps of receiving the software update and retrieving the compatible backup software version from the storage medium.

10. The method of claim 7, wherein the first updatable electronic component comprises an electronic control unit (ECU).

11. The method of claim 7 wherein the software update package comprises a second software update for a second updatable electronic component of the vehicle, the method further comprising:
- installing the second software update in the second updatable electronic component;
- validating installation of the second software update in the second updatable electronic component; and
- storing the second software update as a backup software version for the second updatable electronic component in the storage medium.

12. The method of claim 7, wherein the on-board computer system performs at least the steps of detecting the error or interruption, suspending the installation of the first software update, retrieving the compatible backup software version, and installing the compatible backup software version automatically without requiring user input.

13. The method of claim 7, wherein the software update package is received from a remote computer system via a wireless communication network.

14. The method of claim 7, further comprising:
monitoring a vehicle state condition during installation of the first software update; and
in response to a change in the vehicle state condition, pausing installation of the first software update.

15. A vehicle comprising:
a first electronic control unit (ECU); and
a computing device comprising a wireless modem, a processor, and non-transitory computer-readable storage media, the computing device being programmed to perform actions comprising:
  receiving a first software update package from a remote computer system via the wireless modem, wherein the first software update package comprises a first software update for the first ECU;
  after receiving the first software update package and prior to installing the first software update:
    checking the non-transitory computer-readable media for a previously stored backup software version for the first ECU;
    determining that the previously stored backup software version is not compatible with a current configuration of the vehicle; and
    in response to determining that the previously stored backup software version is not compatible with the current configuration of the vehicle, and prior to determining that the previously stored backup software version is to be re-installed:
      requesting a compatible backup software version;
      receiving the compatible backup software version; and
      storing the compatible backup software version in the non-transitory computer-readable media;
  installing, only after storing the compatible backup software version, the first software update in the first ECU;
  storing the first software update in the storage media as a current backup software version for the first ECU;
  receiving a second software update package from the remote computer system via the wireless modem, wherein the second software update package comprises a second software update for the first ECU;
  initiating an installation of the second software update in the first ECU;
  detecting an error or interruption in the installation of the second software update;
  suspending the installation of the second software update;
  retrieving the current backup software version from the storage media; and
  reinstalling the current backup software version in the first ECU.

16. The vehicle of claim 15, wherein storing the first software update in the storage media as the current backup software version for the first ECU comprises overwriting the compatible backup software version for the first ECU.

17. The vehicle of claim 15, wherein the computing device is further programmed to perform actions comprising:
  prior to initiating the installation of the second software update, checking the current backup software version; and
  if the current backup software version is missing or incompatible with the current vehicle configuration, delaying the installation of the second software update until a new compatible backup software version is obtained.

18. The vehicle of claim 15 further comprising a second ECU, wherein the first software update package comprises a software update for the second ECU, and wherein the computing device is further programmed to perform actions comprising:
  installing the software update for the second ECU; and
  storing the software update for the second ECU as a backup software version for the second ECU.

19. The vehicle of claim 15, wherein the computing device is further programmed to perform at least the steps of detecting the error or interruption, obtaining the compatible backup software version, and installing the compatible backup software version automatically without requiring user input.

20. The vehicle of claim 15, wherein the computing device is further programmed to, prior to storing the first software update in the storage media, validate installation of the first software update in the first ECU.

* * * * *